US012806905B2

(12) United States Patent
Matsuba et al.

(10) Patent No.: US 12,806,905 B2
(45) Date of Patent: Nov. 24, 2026

(54) IMAGE FORMATION DEVICE INCLUDING MOVABLE CAP TO SEAL NOZZLE SURFACE

(71) Applicant: Roland DG Corporation, Hamamatsu (JP)

(72) Inventors: Kikuo Matsuba, Hamamatsu (JP); Kazuhiro Ida, Hamamatsu (JP); Yu Kamiyama, Hamamatsu (JP)

(73) Assignee: ROLAND DG CORPORATION, Shizuoka (JP)

(*) Notice: Subject to any disclaimer, the term of this patent is extended or adjusted under 35 U.S.C. 154(b) by 138 days.

(21) Appl. No.: 18/897,218

(22) Filed: Sep. 26, 2024

(65) Prior Publication Data

US 2025/0010615 A1 Jan. 9, 2025

Related U.S. Application Data

(63) Continuation of application No. PCT/JP2022/016262, filed on Mar. 30, 2022.

(51) Int. Cl.
*B41J 2/165* (2006.01)
*B41J 29/13* (2006.01)

(52) U.S. Cl.
CPC .......... *B41J 2/16511* (2013.01); *B41J 29/13* (2013.01)

(58) Field of Classification Search
CPC B41J 2/16511; B41J 2/16547; B41J 2/16538; B41J 2/16508; B41J 2/165; B41J 29/13; B41J 2/01; B41J 29/38; B41J 2/16502
See application file for complete search history.

(56) References Cited

U.S. PATENT DOCUMENTS

2009/0051729 A1 2/2009 Miyazawa
2010/0025917 A1 2/2010 Yamaguchi
2010/0149252 A1 6/2010 Yoshihisa
2013/0176361 A1 7/2013 Suzuki

FOREIGN PATENT DOCUMENTS

JP 2005349781 A 12/2005
JP 2009045900 A 3/2009
JP 2010052941 A 3/2010
JP 2010142981 A 7/2010
JP 2010201674 A 9/2010
JP 5929199 B2 6/2016

OTHER PUBLICATIONS

International Search Report in PCT/JP2022/016262, mailed May 31, 2022, 2 pages.

*Primary Examiner* — Jannelle M Lebron
(74) *Attorney, Agent, or Firm* — Keating & Bennett, LLP

(57) ABSTRACT

An image formation device includes a recording head which is capable of ejecting droplets from a nozzle, a cap configured to be elevated to a nozzle surface of the nozzle in a sealable manner, a camshaft, a first cam in the camshaft, and a motor to drive the camshaft. The camshaft is rotatable in a first rotation angle range from a reference point in a first direction and a second direction opposite to the first direction by using a position in a rotation direction when the cap is located at a lowest position as the reference point. The first cam is operable to raise the cap as the camshaft rotates in the first rotation angle range from the reference point.

8 Claims, 13 Drawing Sheets

IMAGE FORMATION DEVICE INCLUDING MOVABLE CAP TO SEAL NOZZLE SURFACE

CROSS REFERENCE TO RELATED APPLICATIONS

This application is a Continuation Application of PCT Application No. PCT/JP2022/016262 filed on Mar. 30, 2022. The entire contents of this application are hereby incorporated herein by reference.

BACKGROUND OF THE INVENTION

1. Field of the Invention

The present invention relates to techniques for improving image formation devices.

2. Description of the Related Art

In image formation devices such as printers, facsimiles, copiers, and those that combine the functions of these devices, a droplet ejection device is used that includes a recording head configured with a droplet ejection head for ejecting droplets of ink or the like.

In the device capable of ejecting droplets of ink or the like, an image is formed by causing droplets ejected from the recording head to adhere to or penetrate a recording medium such as recording paper while the recording medium is being transported.

Furthermore, examples of the recording medium include not only the above-described recording paper, but also materials to which liquid can adhere or penetrate, such as fibers such as thread, leather, metal, resin, glass, wood, and ceramics.

In general, the droplet ejection device performs a maintenance recovery process to prevent droplet ejection failure from the nozzles. The maintenance recovery process is a process for maintaining and recovering the function of the nozzle by preventing image sticking due to natural drying of droplets of ink or the like and suctioning and removing droplets of image sticking, and a maintenance recovery mechanism is used for this process.

The maintenance recovery mechanism includes a cap that seals a nozzle surface of the recording head and can maintain the nozzle surface in a wet state, a wiper that wipes the nozzle surface, and a suction pump which is connected to the cap. According to the maintenance recovery mechanism, a cleaning process can be performed in which air bubbles and viscous droplets are forcibly discharged from the nozzle by generating a negative pressure with the suction pump while the nozzle surface is sealed by the cap. As a conventional technique related to such an image formation device, for example, a technique disclosed in Japanese Patent No. 5929199 is known.

The image formation device shown in Japanese Patent No. 5929199 includes a cap holder which holds the cap, a blade holder which holds the wiper, a camshaft which elevates these holders, and a motor which rotates the camshaft. By rotating the motor in one direction, the cap and the wiper can be alternately and repeatedly elevated. Further, for example, when a paper jam occurs in the image formation device, a cap position detection device detects whether the cap is at the lowered position or the raised position and moves the cap to the lowered position by the motor when the cap is at the raised position. If the position of the cap cannot be determined, the image formation device generates an error warning.

SUMMARY OF THE INVENTION

During the operation of the image formation device, the power supply to the image formation device may be cut off for some reasons. In that case, the cap position detection device cannot detect the position of the cap. At this time, when an artificial operation is performed on the image formation device in a stop state, it may cause a trouble. For example, if a carriage is moved to an elevation range of the cap while the position of the cap is unclear and then the motor is driven after the power supply is restored, there is a possibility that the cap may rise and interfere with the carriage. Therefore, when the position of the cap becomes unclear, it is necessary to lower the position of the cap relative to the carriage and return it to the origin. However, since the position of the cap is unclear, it remains unclear whether the motor should be rotated forward or backward to lower and return the cap to the origin without rising.

Example embodiments of the present invention provide image formation devices each capable of preventing a cap from interfering with a carriage even when the position of the cap in a elevation direction relative to a nozzle surface of a nozzle becomes unclear.

According to an example embodiment of the present invention, an image formation device includes a recording head which is capable of ejecting droplets from a nozzle, a cap configured to be elevated to a nozzle surface of the nozzle in a sealable manner, a camshaft which is rotatable in a first rotation angle range from a reference point in a first direction and a second direction opposite to the first direction by using a position in a rotation direction when the cap is located at the lowest position as the reference point, a first cam provided in the camshaft to raise the cap as the camshaft rotates in the first rotation angle range from the reference point, and a motor to drive the camshaft in the first direction and the second direction.

Example embodiments of the present invention provide image formation devices capable of preventing a cap from interfering with a carriage even when a position of the cap in an elevation direction relative to a nozzle surface of a nozzle becomes unclear.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1A:
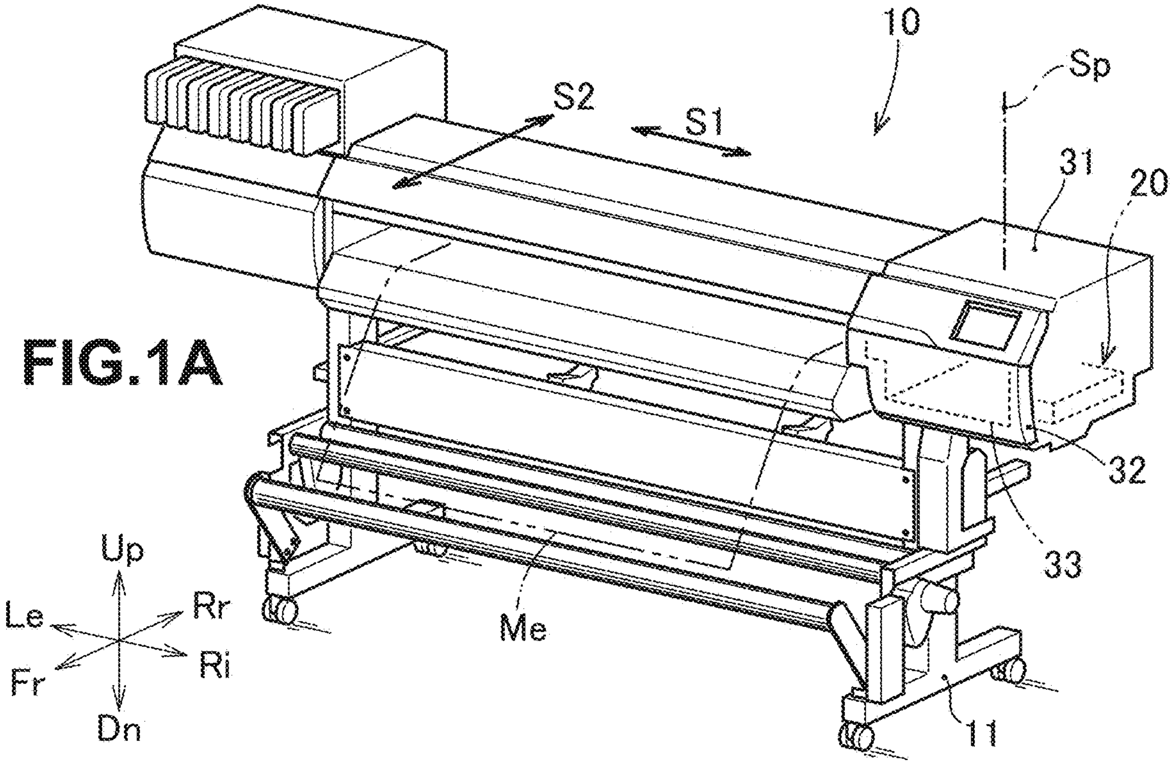
FIG. 1A is a perspective view of an image formation device according to an example embodiment.

Example embodiments of the present invention will be described below based on the attached drawings. Furthermore, the example embodiments shown in the attached drawings are merely examples of the present invention, and the present invention is not limited to these example embodiments. In the description, left and right refer to left and right based on the drawing, and front and rear refer to front and rear based on the feed direction of the medium. Further, in the drawing, Fr indicates front, Rr indicates rear, Le indicates left, Ri indicates right, Up indicates up, and Dn indicates down.

Example Embodiments

As shown in FIG. 1A, an image formation device 10 has a configuration of an inkjet printer capable of forming a color image on a medium Me. This image formation device 10 can print, for example, large-size signs and posters.

Here, the width direction S1 of the medium Me based on the feed direction S2 of the medium Me fed by a conveying device (not shown) of the image formation device 10 is referred to as the "main scanning direction S1" as appropriate. Further, the feed direction S2 of the medium Me is referred to as the "sub-scanning direction S2" as appropriate. When the image formation device 10 is viewed from above, the sub-scanning direction S2 is a direction orthogonal to the main scanning direction S1.

The medium Me to be printed is, for example, a roll medium wound on a roll, and the medium may be made of a variety of materials, including paper such as ordinary paper, resins such as polyvinyl chloride resin and polyester resin, and metals such as aluminum and iron.

Figure 1B:
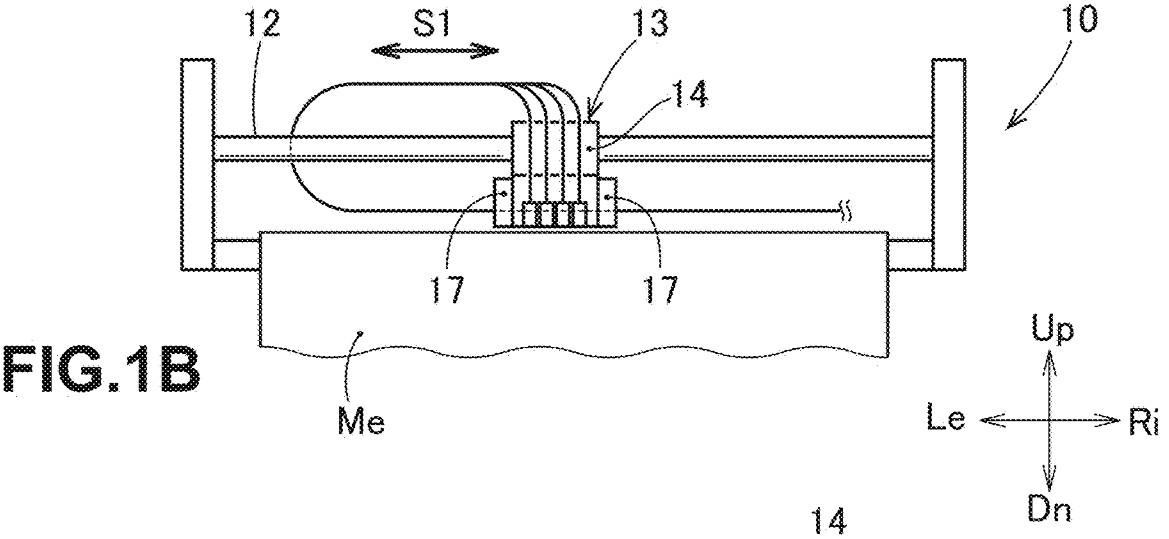
FIG. 1B is a conceptual diagram illustrating the periphery of a recording head of the image formation device according to an example embodiment.

As shown in FIG. 1B, the image formation device 10 includes a rail 12 which extends in the main scanning direction S1 of the base 11, a carriage 13 which is movably provided in the rail 12, a recording head 14 (print head 14) which is provided in the carriage 13, and at least one (for example, two) light irradiation devices 17 and 17. These light irradiation devices 17 and 17 irradiate light onto the photocurable ink ejected from the recording head 14 onto the medium Me, thereby curing the photocurable ink.

Figure 1C:
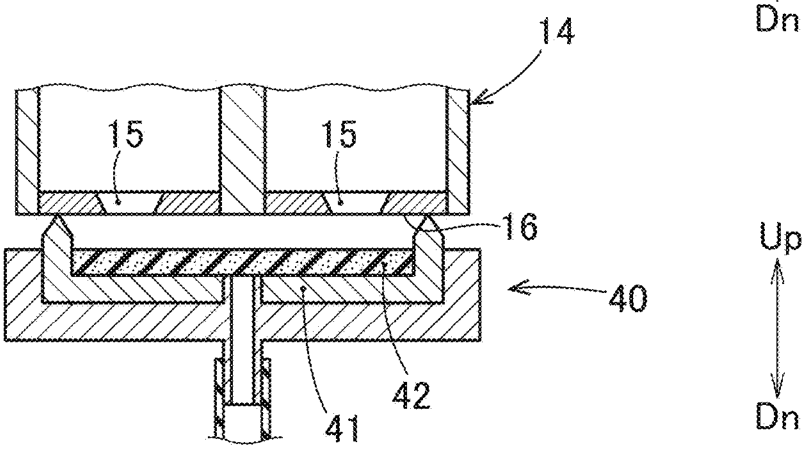
FIG. 1C is a conceptual diagram illustrating a relationship between a cap and the recording head of the image formation device according to an example embodiment.

As shown in FIGS. 1B and 1C, the recording head 14 has a plurality of nozzles 15 capable of ejecting various ink droplets. A lower end surface of the recording head 14 forms a nozzle surface 16 of each nozzle 15.

Figure 2:
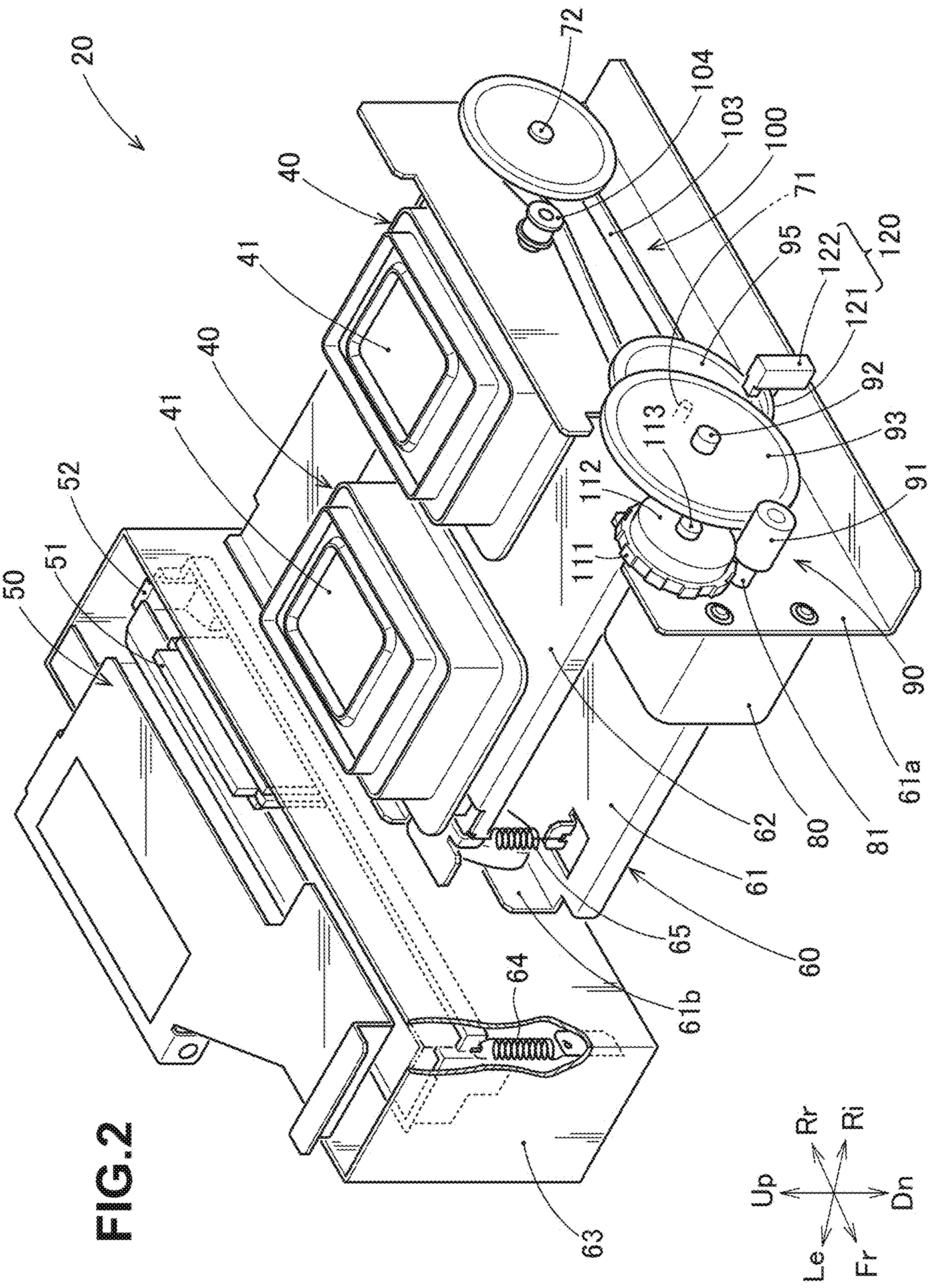
FIG. 2 is a perspective view of a cleaning unit shown in FIG. 1A.

The image formation device 10 includes a cleaning unit 20 shown in FIG. 2. As shown in FIGS. 1A and 1B, the cleaning unit 20 is located at a standby position Sp, which is located at a predetermined timing such as when the recording head 14 finishes printing on the medium Me, below the carriage 13 and is covered by a cover 31. The standby position Sp is located at the right end portion of the image formation device 10 in the main scanning direction S1.

The cover 31 is removably attached to the base 11. The cover 31 has an opening 33 on the front surface thereof which is opened and closed by a lid 32.

Also referring to FIG. 1C, the cleaning unit 20 includes a cap assembly 40 which can seal the nozzle surface 16 of the recording head 14, a wiper assembly 50 which can wipe the nozzle surface 16 of the recording head 14, and an elevator 60 which elevates the cap assembly 40 and the wiper assembly 50.

As shown in FIG. 1C, the cap assembly 40 protects the nozzle surface 16 of the recording head 14 located at the standby position Sp by a cap 41 including a flexible material such as rubber, and prevents foreign matter such as dust from adhering to the nozzles 15, as well as preventing clogging of the nozzles 15 and the inclusion of air bubbles. In other words, when the recording head 14 is located at the standby position Sp at a predetermined timing, such as when printing is completed, the cap assembly 40 rises and the cap 41 seals the nozzle surface 16. The cap 41 includes an absorber 42 capable of absorbing the ink ejected from the nozzles 15 of the recording head 14.

The carriage 13 may be provided with a plurality of recording heads 14. As shown in FIG. 2, in this example embodiment, a plurality of cap assemblies 40 are also provided to correspond thereto. The caps 41 and 41 of the cap assemblies 40 and 40 are arranged at positions respectively corresponding to the plurality of recording heads 14. When there is only one recording head 14, only one cap assembly 40 is required.

As shown in FIG. 1C and FIG. 2, the wiper assembly 50 includes a wiper 51 capable of wiping the nozzle surface 16 of the recording head 14 and a wiper support portion 52 that supports the wiper 51. The wiper 51 is made of a flexible material such as rubber. When the recording head 14 is located at the standby position Sp (see FIG. 1A) at a predetermined timing, such as when printing is completed, the wiper 51 rises. By moving the wiper 51 in the sub-scanning direction S2 relative to the nozzle surface 16, the wiper 51 can wipe ink, foreign matter, and other adhering materials adhering to the nozzle surface 16.

Figure 3:
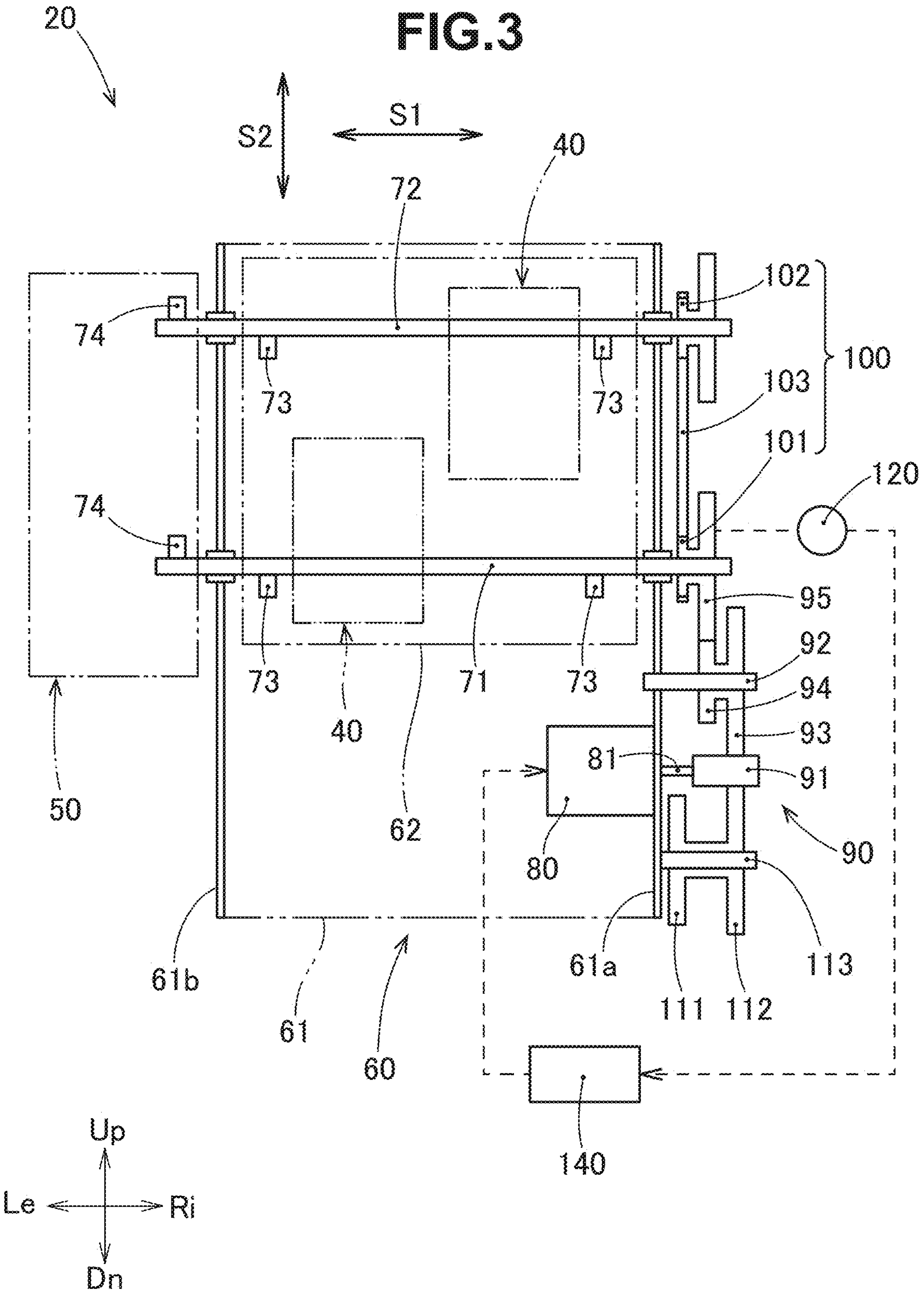
FIG. 3 is a schematic diagram of the cleaning unit shown in FIG. 2.

As shown in FIG. 2 and FIG. 3, the elevator 60 includes a flat plate-shaped fixed base 61 which is attached to the base 11 (see FIG. 1A), a flat plate-shaped elevation platform 62 which is located on the fixed base 61 and supports the cap assembly 40, and a sub-base 63 which is provided at one end of the fixed base 61 and supports the wiper assembly 50 to be raised and lowered. The fixed base 61 includes a first wall plate 61*a* and a second wall plate 61*b* which are erected from both ends in the main scanning direction S1. The first wall plate 61*a* is located at the right end in the main scanning direction S1, and the second wall plate 61*b* is located at the left end in the main scanning direction S1.

The wiper support portion 52 is biased downward (in a direction away from the nozzle surface 16 of the recording head 14 shown in FIG. 1C) relative to the sub-base 63 by a plurality of biasing structures 64. The biasing structure 64 is configured by, for example, a tension coil spring.

The elevation platform 62 is a flat plate-shaped structure that is spaced apart from the fixed base 61 at the upper side thereof and is supported to be movable only in the elevation direction relative to the fixed base 61. The elevation platform 62 is biased downward (away from the nozzle surface 16 of the recording head 14) relative to the fixed base 61 by a plurality of biasing structures 65. The biasing structure 65 is configured by, for example, a tension coil spring. The cap assembly 40 is attached on the elevation platform 62.

The elevator 60 includes at least one (two in this example embodiment) camshafts 71 and 72 which elevate the wiper assembly 50 and the elevation platform 62, a motor 80 which drives the camshafts 71 and 72, and a gear mechanism 90 which connects an output shaft 81 of the motor 80 and the camshafts 71 and 72.

The camshafts 71 and 72 extend in the main scanning direction S1, are arranged in parallel, and pass between the fixed base 61 and the elevation platform 62. Each of the camshafts 71 and 72 penetrates the first wall plate 61*a* and the second wall plate 61*b* of the fixed base 61 and is rotatably supported by the first and second wall plates 61*a* and 61*b*. One of the camshafts 71 and 72 is referred to as the first camshaft 71 and the other is referred to as the second camshaft 72.

Figure 4:
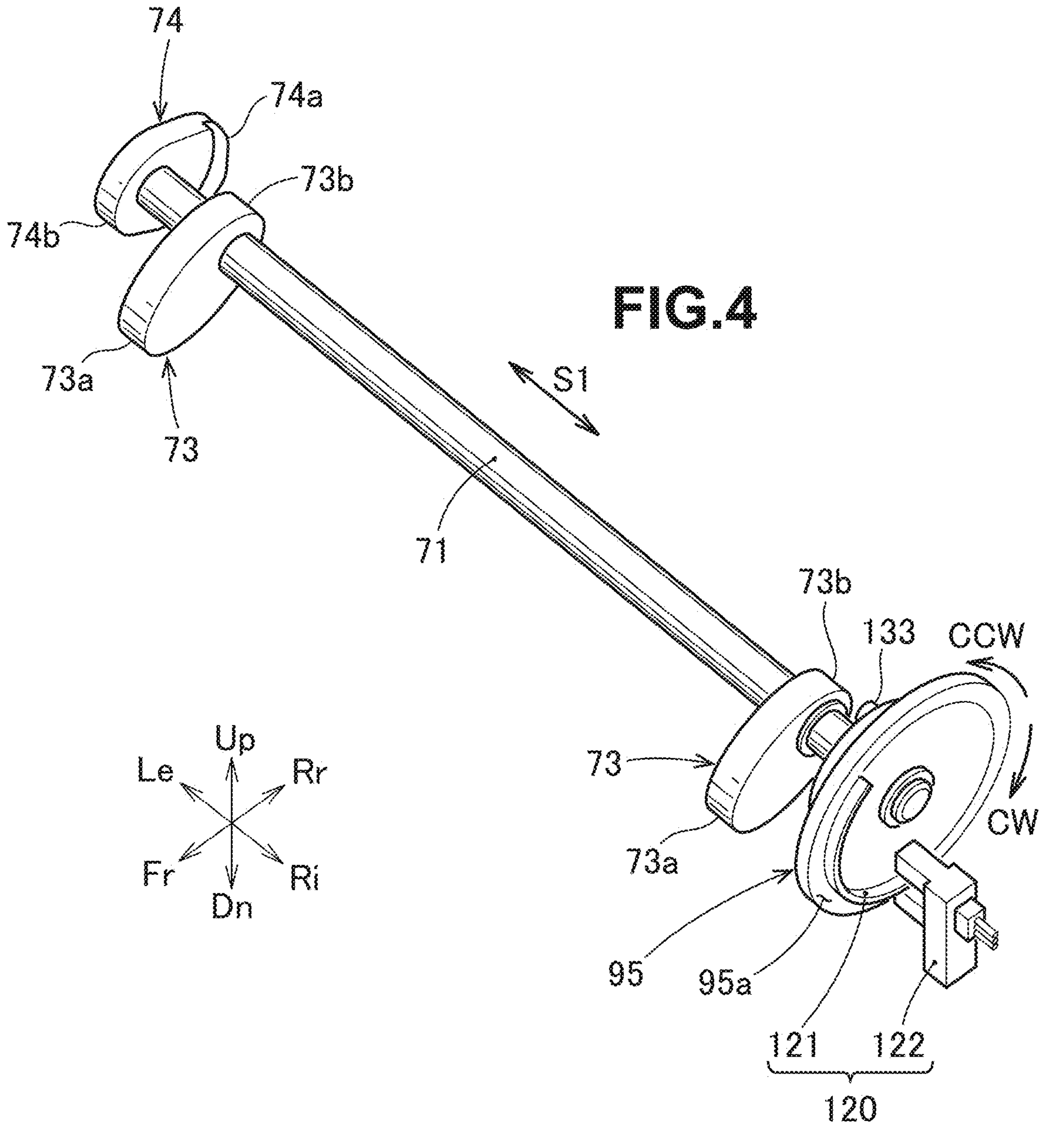
FIG. 4 is a perspective view of a first camshaft, a cam, and a rotation angle detector shown in FIG. 3.

Also referring to FIG. 4, the first camshaft 71 includes at least one (two in this example embodiment) first cam 73 which elevates the elevation platform 62 and at least one second cam 74 which elevates the wiper assembly 50.

The first cam 73 and the second cam 74 are configured by structures having an elongated shape such as an ellipse or an oval shape when viewed in the axial direction of the first camshaft 71. The longitudinal center of each of the elongated cams 73 and 74 is offset from the first camshaft 71. As shown in FIG. 4, in both ends 73*a* and 73*b* of the first cam 73 in the longitudinal direction, the tip surface 73*a* farther from the first camshaft 71 is referred to as the "first end surface 73*a*", and the tip surface 73*b* closer to the first camshaft 71 is referred to as the "second end surface 73*b*". In both ends 74*a* and 74*b* of the second cam 74 in the longitudinal direction, the tip surface 74*a* farther from the first camshaft 71 is referred to as the "first end surface 74*a*", and the tip surface 74*b* closer to the first camshaft 71 is referred to as the "second end surface 74*b*". The orientations of the first cam 73 and the second cam 74 relative to the first camshaft 71 are different from each other.

When the elevation platform 62 is pushed up to the maximum by the first end surface 73*a* of the first cam 73, the elevation platform 62 and the cap 41 are located at the highest position. When the second end surface 73*b* of the first cam 73 is in contact with the elevation platform 62, the elevation platform 62 and the cap 41 are located at the lowest position.

When the wiper support portion 52 is pushed up to the maximum by the first end surface 74*a* of the second cam 74, the wiper 51 is located at the highest position. When the second end surface 74*b* of the second cam 74 is in contact with the wiper support portion 52, the wiper 51 is located at the lowest position.

Since the configuration of the second camshaft 72 is the same as that of the first camshaft 71, a description thereof will be omitted.

As shown in FIG. 2 and FIG. 3, the motor 80 is attached to the first wall plate 61*a*. The gear mechanism 90 is located on the right side of the first wall plate 61*a*. The gear mechanism 90 includes a first gear 91 (pinion 91) which is integrally provided in the output shaft 81 of the motor 80, a second gear 93 which has a large diameter and is rotatably provided in the intermediate shaft 92 to mesh with the first gear 91, a third gear 94 which has a small diameter and is integrally provided in the second gear 93, and a fourth gear 95 which has a large diameter and is integrally provided in the first camshaft 71 to mesh with the third gear 94. The intermediate shaft 92 is provided in the first wall plate 61*a*.

The gear mechanism 90 includes a belt mechanism 100. The second camshaft 72 is connected to the first camshaft 71 by the belt mechanism 100. The belt mechanism 100 includes a drive pulley 101 which is integrally provided in the first camshaft 71, a driven pulley 102 which is integrally provided in the second camshaft 72, and a belt 103 which is wound around the drive pulley 101 and the driven pulley 102. The drive pulley 101 is, for example, integrally formed with the fourth gear 95. The diameter of the drive pulley 101 is the same as the diameter of the driven pulley 102. Therefore, the rotation angle of the second camshaft 72 is the same as the rotation angle of the first camshaft 71. Further, since the belt mechanism 100 is adopted, the rotation direction of the second camshaft 72 is the same as the rotation direction of the first camshaft 71. The tension of the belt 103 is adjusted by a tensioner 104 (see FIG. 2).

Moreover, the gear mechanism 90 includes a manual adjustment dial 111 that can be manually turned while the motor 80 is stopped. The dial 111 is provided on one of the gears in the gear mechanism 90. For example, the dial 111 can be provided on the first gear 91 that rotates together with the output shaft 81 of the motor 80. Also, for example, the gear mechanism 90 may include a separate gear 112 (fifth gear 112) that meshes with the first gear 91, and the dial 111 may be integrally provided on the fifth gear 112. In this example embodiment, the dial 111 is provided on the fifth gear 112. A support shaft 113 that rotatably supports the fifth gear 112 is provided on the first wall plate 61*a*.

In this way, the output shaft 81 of the motor 80 and the camshaft 71 are connected by the gear mechanism 90. One of the gears 112 (fifth gear 112) in the gear mechanism 90 is provided with the dial 111 that can be manually turned while the motor 80 is stopped.

Therefore, when the power supply to the image formation device 10 is cut off for some reason, the dial 111 can be turned to raise the cap 41 and seal the nozzle surface 16 of the nozzles 15 of the recording head 14.

Figure 5:
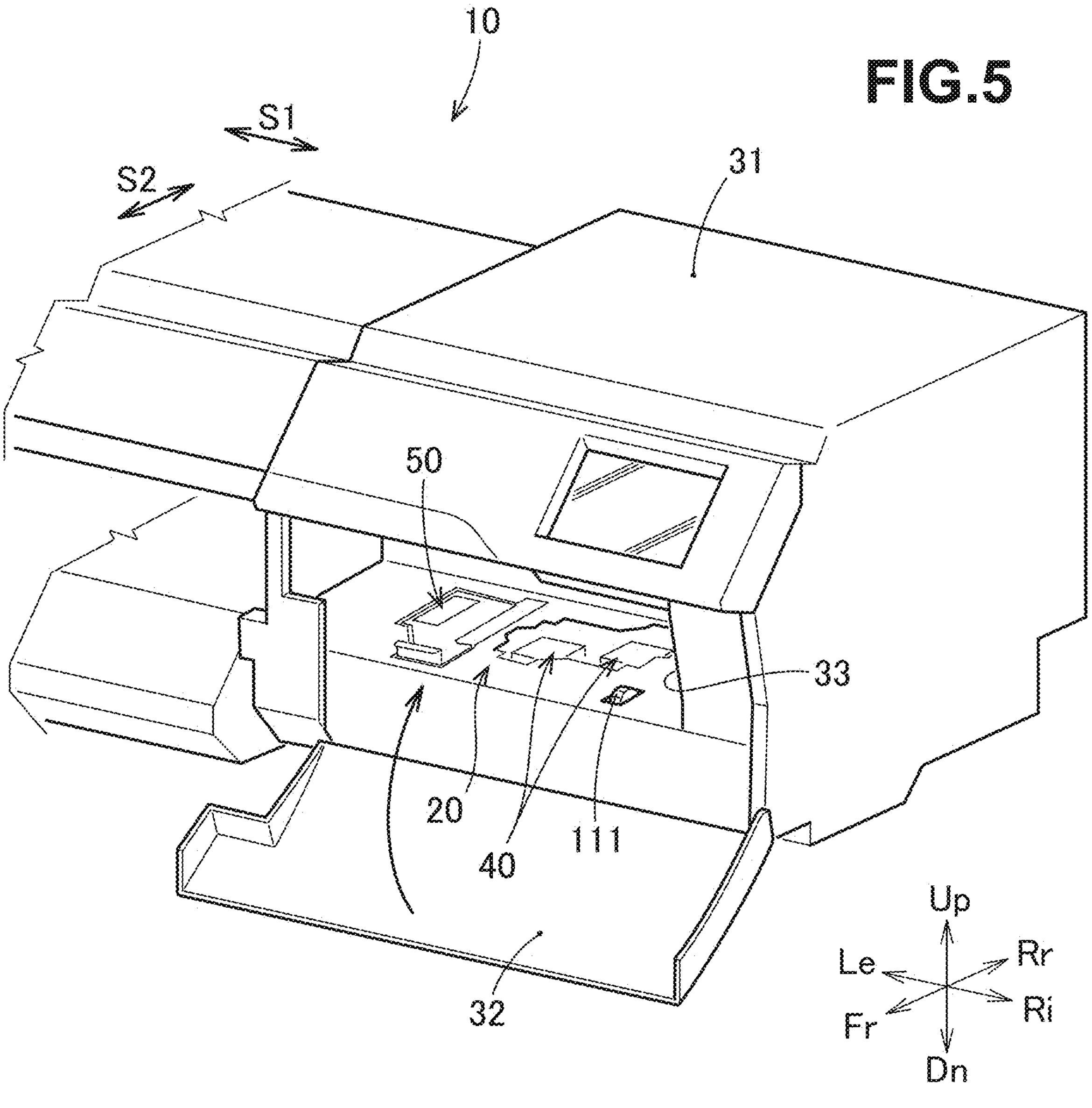
FIG. 5 is a perspective view of the periphery of a cover shown in FIG. 1A.

As shown in FIG. 5, the dial 111 is covered by the removable cover 31.

Therefore, since the dial 111 is covered by the cover 31 (including the lid 32) in a normal state, there is no risk of erroneous operation. Only when performing the maintenance of the recording head 14 or the cap 41, the cover 31 can be removed (for example, the lid 32 can be opened) and the dial 111 can be turned.

Figure 6:
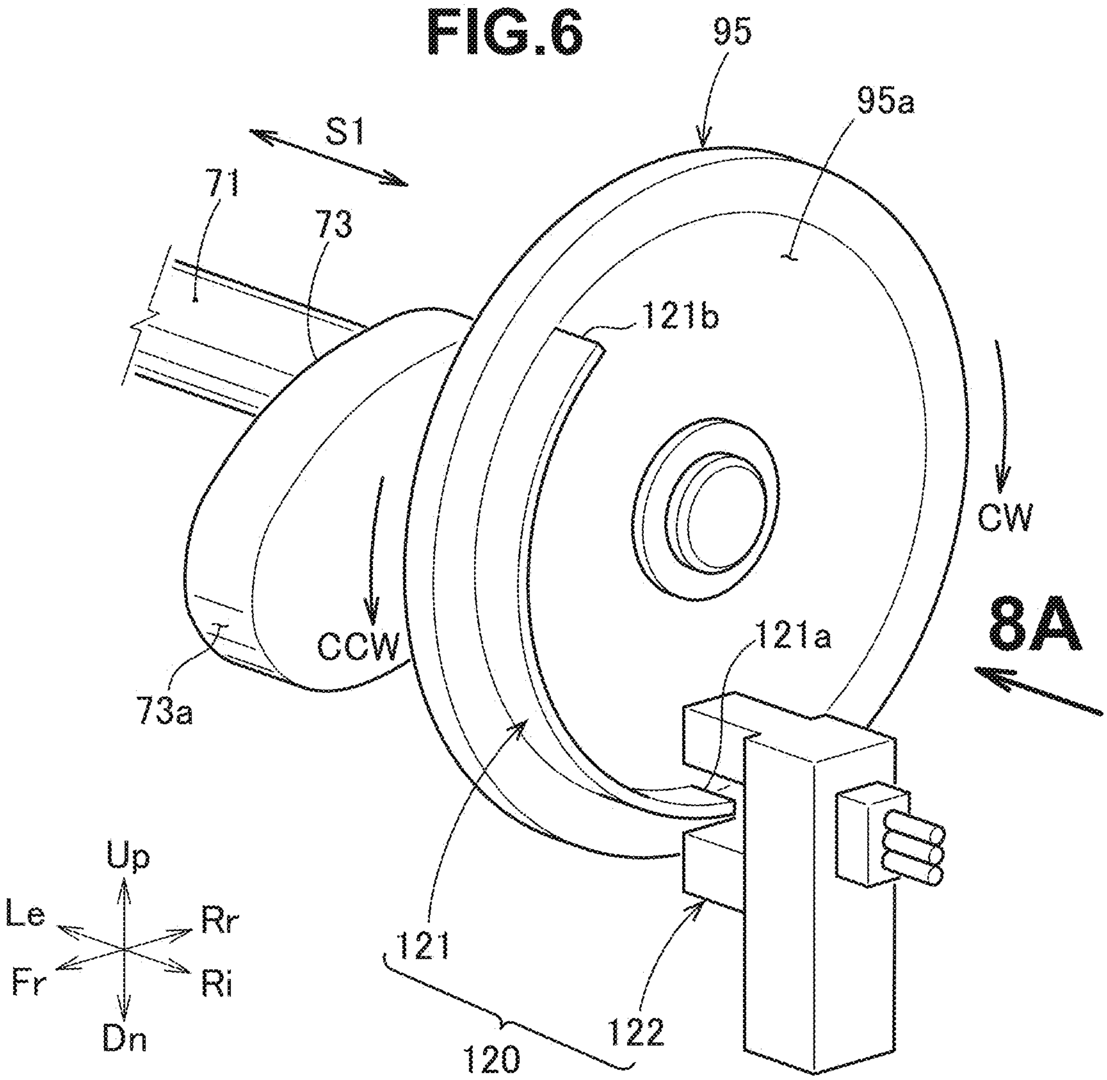
FIG. 6 is a perspective view of the rotation angle detector shown in FIG. 4.

As shown in FIG. 6, the image formation device 10 includes a rotation angle detector 120 which can detect the rotation angle θ of the first camshaft 71. The rotation angle detector 120 includes a semicircular detection object 121 that rotates together with the first camshaft 71 and a detector 122 that can detect the rotation angle θ of the first camshaft 71 by detecting the detection object 121 itself.

The detection object 121 is integrally provided in, for example, the fourth gear 95 (final gear 95) provided in the first camshaft 71. More specifically, the detection object 121 is provided on one side surface 95*a* of the fourth gear 95 in the axial direction, and is configured by an arc fin centered on the first camshaft 71. The fin has a uniform width or thickness. In the detection object 121, one end 121*a* in the circumferential direction is referred to as the "first end 121*a*", and the other end 121*b* is referred to as the "second end 121*b*".

Figure 7:
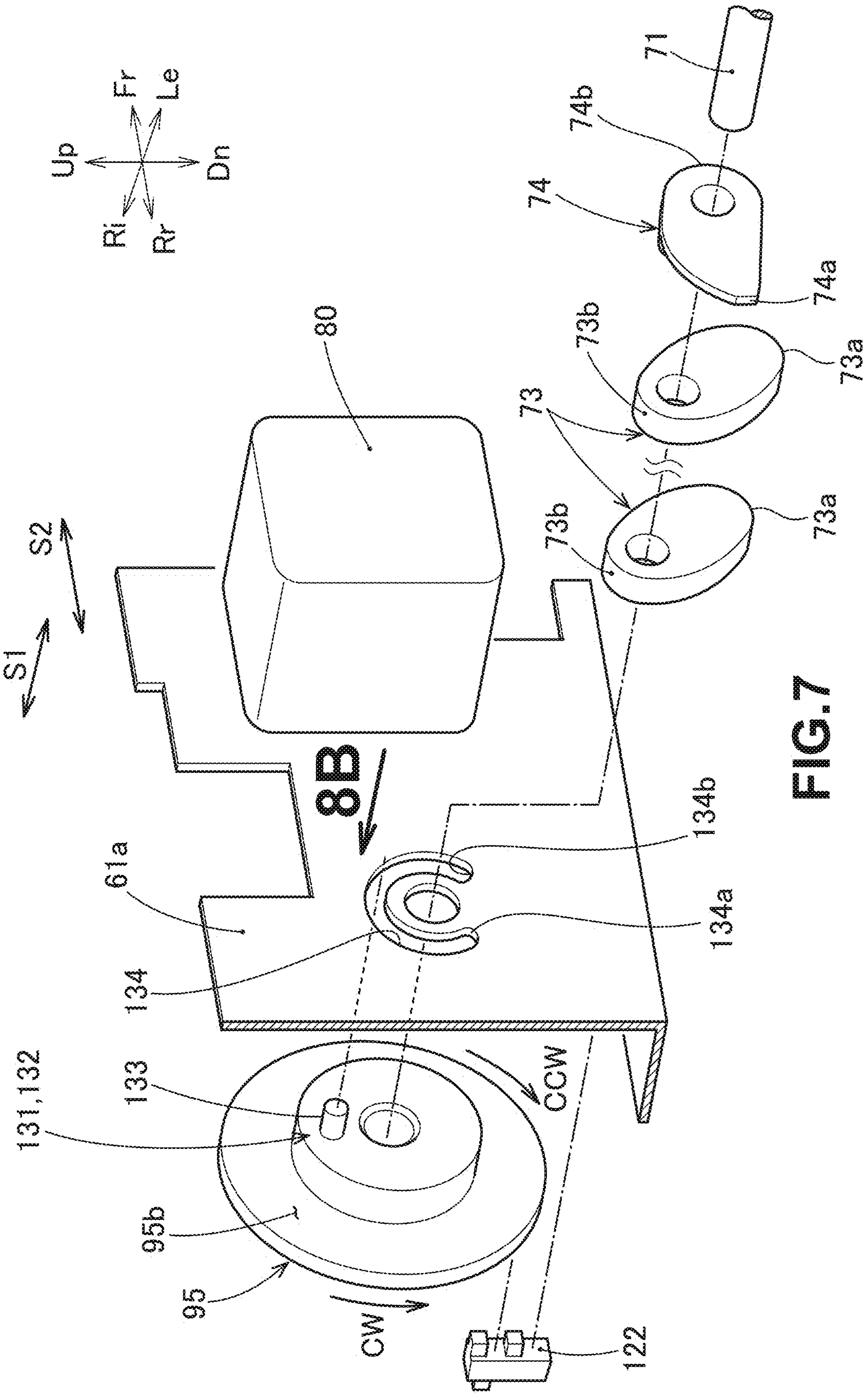
FIG. 7 is an exploded view of the periphery of a fourth gear and a stopper according to an example embodiment when viewed from the opposite side to the rotation angle detector.

The detector 122 is configured by, for example, an optical sensor. The optical sensor is preferably configured as a photointerrupter capable of detecting the presence or absence of the detection object 121 configured as a fin. As shown in FIG. 7, the detector 122 is attached to the first wall plate 61*a* (fixing structure 61*a*).

As shown in FIG. 7, the image formation device 10 includes a first stopper 131 which restricts the rotation of the first camshaft 71 in the first direction CW and a second stopper 132 which restricts the rotation of the first camshaft 71 in the second direction CCW. The first stopper 131 and the second stopper 132 are configured by, for example, the first wall plate 61*a* (fixing structure 61*a*) including a single pin 133 integrally provided in the fourth gear 95 (final gear 95) and a single arc elongated hole 134 fittable to the pin 133.

The pin 133 extends along the first camshaft 71 from the other side surface 95*b* of the fourth gear 95 in the axial direction into the elongated hole 134. The pin 133 is offset radially outward from the first camshaft 71. The elongated hole 134 is formed in an arc shape centered on the first camshaft 71. One edge 134*a* of the elongated hole 134 in the circumferential direction is referred to as the "first edge 134*a*", and the other edge 134*b* is referred to as the "second edge 134*b*".

That is, the first stopper 131 is configured to restrict the rotation of the first camshaft 71 in the first direction CW in such a manner that the pin 133 comes into contact with the first edge 134*a* of the elongated hole 134 formed in the first wall plate 61*a*. The second stopper 132 is configured to restrict the rotation of the first camshaft 71 in the second direction CCW in such a manner that the pin 133 comes into contact with the second edge 134*b* of the elongated hole 134 formed in the first wall plate 61*a*.

The first stopper 131 and the second stopper 132 have a strength against the maximum load received by the maximum output of the motor 80.

Therefore, even if the driving force of the camshaft 71 by the motor 80 becomes excessive, excessive rotation of the camshaft 71 can be restricted or prevented, and excessive rising of the cap 41 and the wiper 51 can be restricted or prevented.

Further, as described above, the first stopper 131 and the second stopper 132 are configured by the fixing structure 61*a* (first wall plate 61*a*) including a single pin 133 extending from the final gear 95 along the camshaft 71 and a single arc elongated hole 134 centered on the camshaft 71 so that the pin 133 is fittable thereinto. The detector 122 is attached to the fixing structure 61*a*.

Therefore, the first stopper 131 and the second stopper 132 can have a simple configuration.

Figures 8A, 8B:
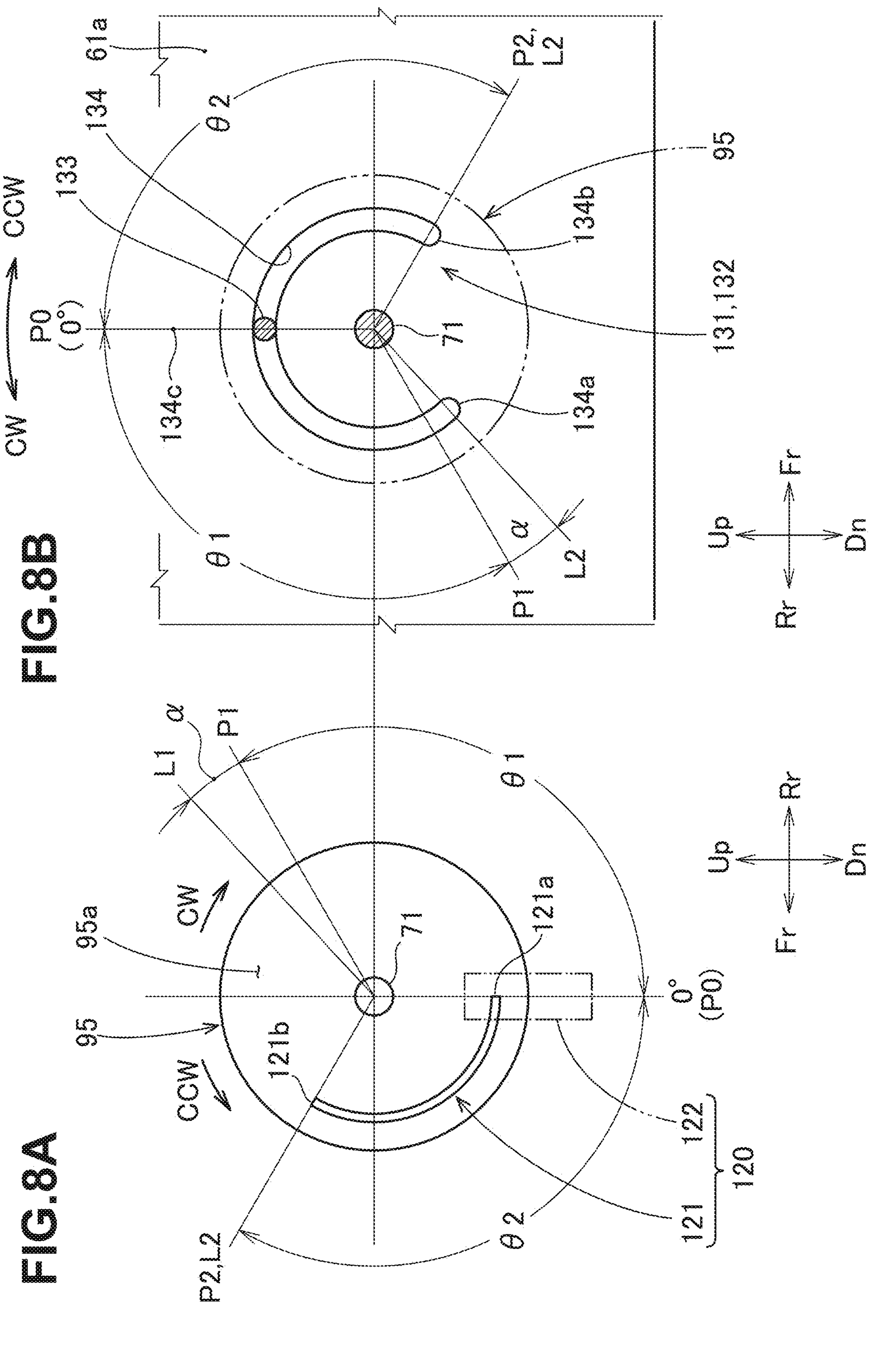
FIG. 8A is a conceptual diagram of the rotation angle detector when viewed from the direction of an arrow 8A shown in FIG. 6
FIG. 8B is a conceptual diagram of the stopper when viewed from the direction of an arrow 8B shown in FIG. 7.

Next, a relationship between the rotation angle detector 120 and the first and second stoppers 131 and 132 will be described based on FIG. 8A, FIG. 8B, and FIG. 9. FIG. 8A shows the rotation angle detector 120 when viewed from the direction of an arrow 8A in FIG. 6. FIG. 8B shows the first and second stoppers 131 and 132 when viewed from the direction of an arrow 8B in FIG. 7.

Figure 9:
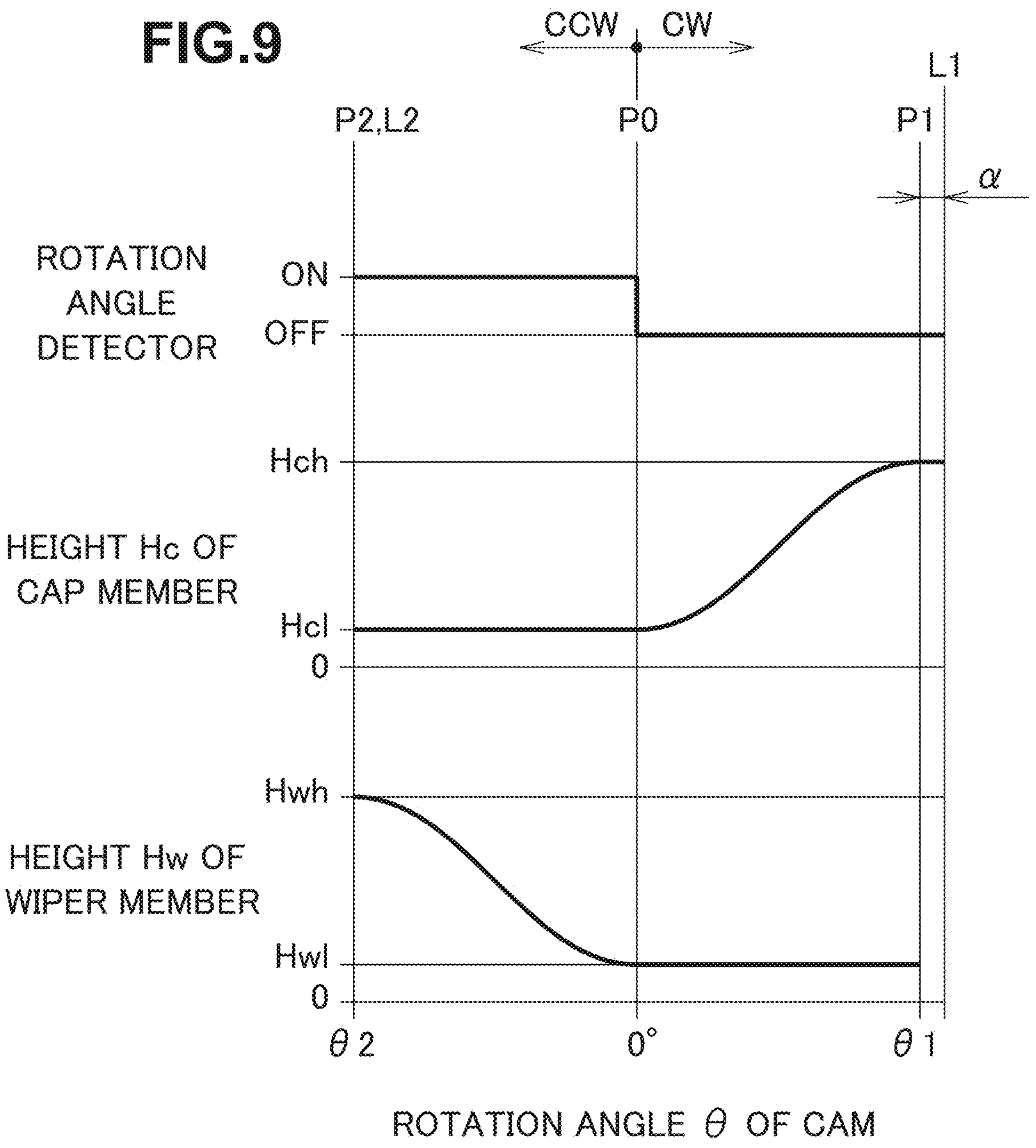
FIG. 9 is a characteristic diagram illustrating the operating characteristics of the cleaning unit shown in FIG. 3.

As shown in FIG. 8A and FIG. 9, the first end 121*a* of the detection object 121 of the rotation angle detector 120 in the circumferential direction corresponds to the position of the reference point P0 (origin P0) of the first camshaft 71 in the rotation direction. The reference point P0 is a position of the first camshaft 71 in the rotation direction when the cap 41 is located at the lowest position Hc1 and the wiper 51 is located at the lowest position Hw1. At this time, as shown in FIG. 8B, the pin 133 is located at a midpoint 134*c* of the elongated hole 134 in the circumferential direction.

When the first camshaft 71 rotates from the reference point P0 in the clockwise direction CW (first direction CW) in the drawing to a preset first point P1, the range θ1 from the reference point P0 to the first point P1 is referred to as the "first rotation angle range θ1". A point L1, which is further rotated in the first direction CW by a preset constant angle α from the first point P1, is referred to as the "limit point L1 in the first direction CW from the reference point P0". The detector 122 detects that the first camshaft 71 is in the first rotation angle range θ1 by not detecting the detection object 121. That is, the detector 122 generates a non-detection signal (OFF signal).

As shown in FIG. 8B, when the first camshaft 71 rotates to the limit point L1 in the first direction CW, the pin 133 comes into contact with the first edge 134*a* of the elongated hole 134 in the circumferential direction. That is, the first stopper 131 is located at the limit point L1 in the first direction CW, thus restricting or preventing the rotation of the first camshaft 71 in the first direction CW.

As shown in FIG. 8A and FIG. 9, when the first camshaft 71 rotates from the reference point P0 in the counterclockwise direction CCW (second direction CCW) in the drawing to a preset second point P2, the range θ2 from the reference point P0 to the second point P2 is referred to as the "second rotation angle range θ2". The second point P2 is referred to as the "limit point L2 in the second direction CCW relative to the reference point P0".

As shown in FIG. 8B, when the first camshaft 71 rotates to the limit point L2 (including the point immediately before the limit point L2) in the second direction CCW, the pin 133 comes into contact with the second edge 134*b* of the elongated hole 134 in the circumferential direction. That is, the second stopper 132 is located at the limit point L2 in the second direction CCW, thus restricting or preventing the rotation of the first camshaft 71 in the second direction CCW.

As shown in FIG. 8A and FIG. 9, the detection object 121 of the rotation angle detector 120 has the first end 121*a* in the circumferential direction that corresponds to the position of the reference point P0 of the first camshaft 71 and is continuous from the reference point P0 over the entire second rotation angle range θ2. The range θ2 from the first end 121*a* to the second end 121*b* of the detection object 121 corresponds to the second rotation angle range θ2 of the first camshaft 71.

The detector 122 detects the position of the reference point P0 by detecting the position of the first end 121*a* of the detection object 121 and generates a detection signal (ON signal). Furthermore, the detector 122 detects that the first camshaft 71 is in the second rotation angle range θ2 by continuously detecting the detection object 121 and continuously generates a detection signal (ON signal).

When summarizing the above description, the detector 122 generates a non-detection signal (OFF signal) when the first camshaft 71 is located at the first rotation angle range θ1. When the first camshaft 71 in the first rotation angle range θ1 rotates in the second direction CCW and reaches the reference point P0, the signal of the detector 122 switches from a non-detection signal (OFF signal) to a detection signal (ON signal). When the first camshaft 71 is in the second rotation angle range θ2, the detector 122 continuously generates a detection signal (ON signal). When the first camshaft 71 in the second rotation angle range θ2 rotates in the first direction CW and reaches the reference point P0, the signal of the detector 122 switches from a detection signal (ON signal) to a non-detection signal (OFF signal). In this way, the rotation angle detector 120 detects whether the rotation angle θ of the first camshaft 71 is in the reference point P0, the first rotation angle range θ1, or the second rotation angle range θ2.

As shown in FIG. 3, the image formation device 10 includes a controller 140 configured or programmed to control the motor 80. Also referring to FIG. 9, the controller 140 is configured or programmed to control the motor 80 in a direction to return the rotation angle θ of the first camshaft 71 to the reference point P0 when receiving a signal from the rotation angle detector 120 indicating that the rotation angle θ of the first camshaft 71 is in either the first rotation angle range θ1 or the second rotation angle range θ2.

Next, the control by the controller 140 will be described based on FIG. 10 with reference to FIG. 3 and FIG. 9. The controller 140 may include, for example, a microcomputer. An example of a specific control by the controller 140 including a microcomputer will be described below.

Figure 10:
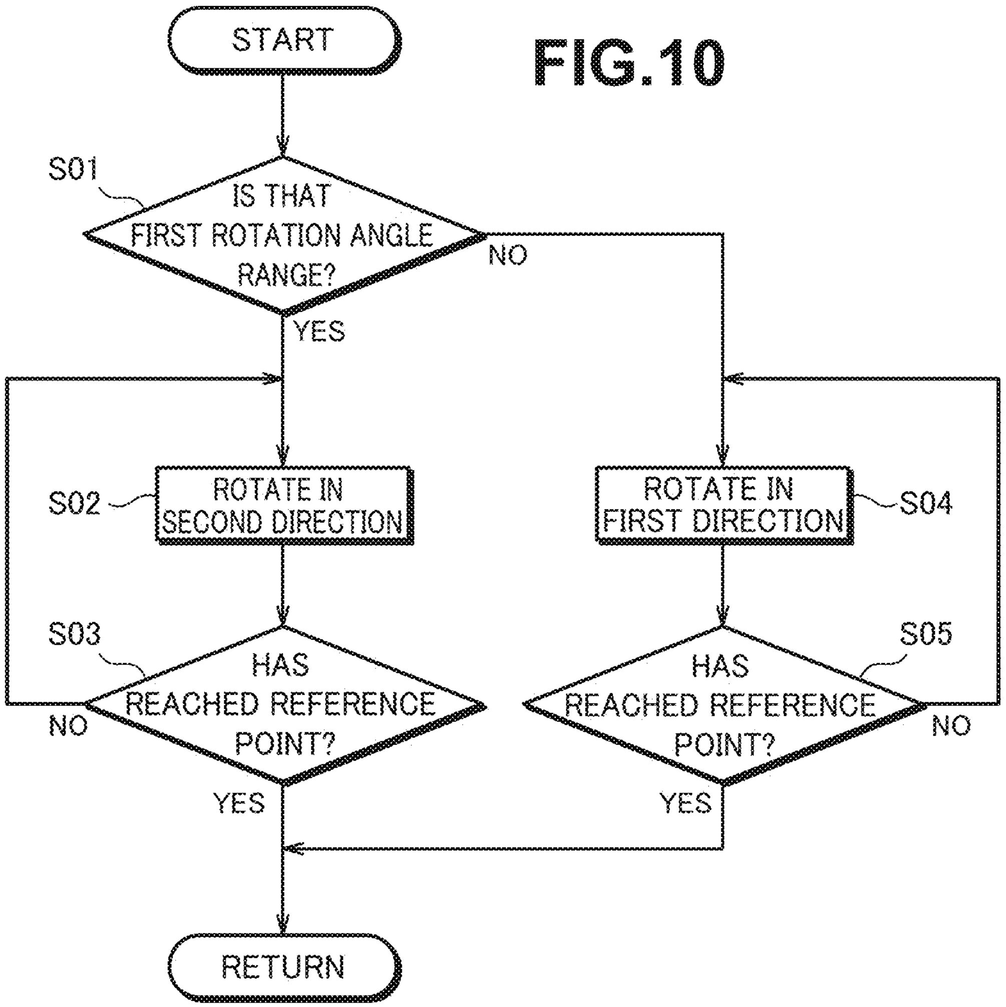
FIG. 10 is a control flowchart of a controller shown in FIG. 3.

FIG. 10 is a control flowchart of the controller 140, and shows a subroutine for executing a control process to return the rotation angle θ of the first camshaft 71 to the reference point P0 among a series of controls by the controller 140. This subroutine is executed by interrupt processing under a certain condition or by time sharing processing. For example, this subroutine is executed when power is supplied to the image formation device 10, for example, when the power switch is turned on.

When the controller 140 starts the control, first in step S01, it is determined whether the rotation angle θ of the first camshaft 71 is the first rotation angle range θ1. In step S01, if a non-detection signal (OFF signal) is received from the rotation angle detector 120, that is, if it is determined that the rotation angle is in the first rotation angle range θ1, the cap 41 is located at the raised position, so the process proceeds to step S02.

In step S02, the motor 80 is controlled to rotate the first camshaft 71 in the second direction CCW, that is, in a direction to return the rotation angle θ of the first camshaft 71 to the reference point P0, and the process proceeds to step S03.

In step S03, it is determined whether the rotation position of the first camshaft 71 has reached the reference point P0 (whether the rotation angle θ has returned to zero), and step S02 is repeated until it has been reached. In step S03, if a signal from the rotation angle detector 120 is switched from a non-detection signal (OFF signal) to a detection signal (ON signal), that is, the first camshaft 71 in the first rotation angle range θ1 rotates in the second direction CCW to return to the reference point P0, the subroutine ends after the motor 80 is stopped. As a result, the position of the cap 41 can be lowered to the lowest position Hc1.

On the other hand, in step S01, if it is determined that the rotation angle θ of the first camshaft 71 is not in the first rotation angle range θ1, a detection signal (ON signal) is received from the rotation angle detector 120. In step S01, if it is determined that the rotation angle θ of the first camshaft 71 is in the second rotation angle range θ2, the cap 41 is at the lowered position, and the process proceeds to step S04.

In step S04, the motor 80 is controlled to rotate the first camshaft 71 in the first direction CW, that is, in a direction to return the rotation angle θ of the first camshaft 71 to the reference point P0, and the process proceeds to step S05.

In step S05, it is determined whether the rotation position of the first camshaft 71 has reached the reference point P0 (whether the rotation angle θ has returned to zero), and step S04 is repeated until it has been reached. In step S04, when the signal from the rotation angle detector 120 is switched from a detection signal (ON signal) to a non-detection signal (OFF signal), that is, when it is determined that the first camshaft 71 in the second rotation angle range θ2 has rotated in the first direction CW and returned to the reference point P0, the motor 80 is stopped and then the subroutine is terminated. As a result, the wiper 51 can be lowered to the lowest position Hw1.

Furthermore, if the rotation position of the first camshaft 71 is initially located at the reference point P0, first in step S01, it is determined that a detection signal (ON signal) is received. Then in step S04, the first camshaft 71 is rotated in the first direction CW, and then in step S04, it is determined that the detection signal (ON signal) has been switched to a non-detection signal (OFF signal), and the motor 80 is stopped. In other words, the motor 80 can be stopped instantly by following this series of steps.

Next, the operation of elevating the cap assembly 40 and the wiper assembly 50 by the elevator 60 will be described with reference to FIG. 9.

Figure 11A:
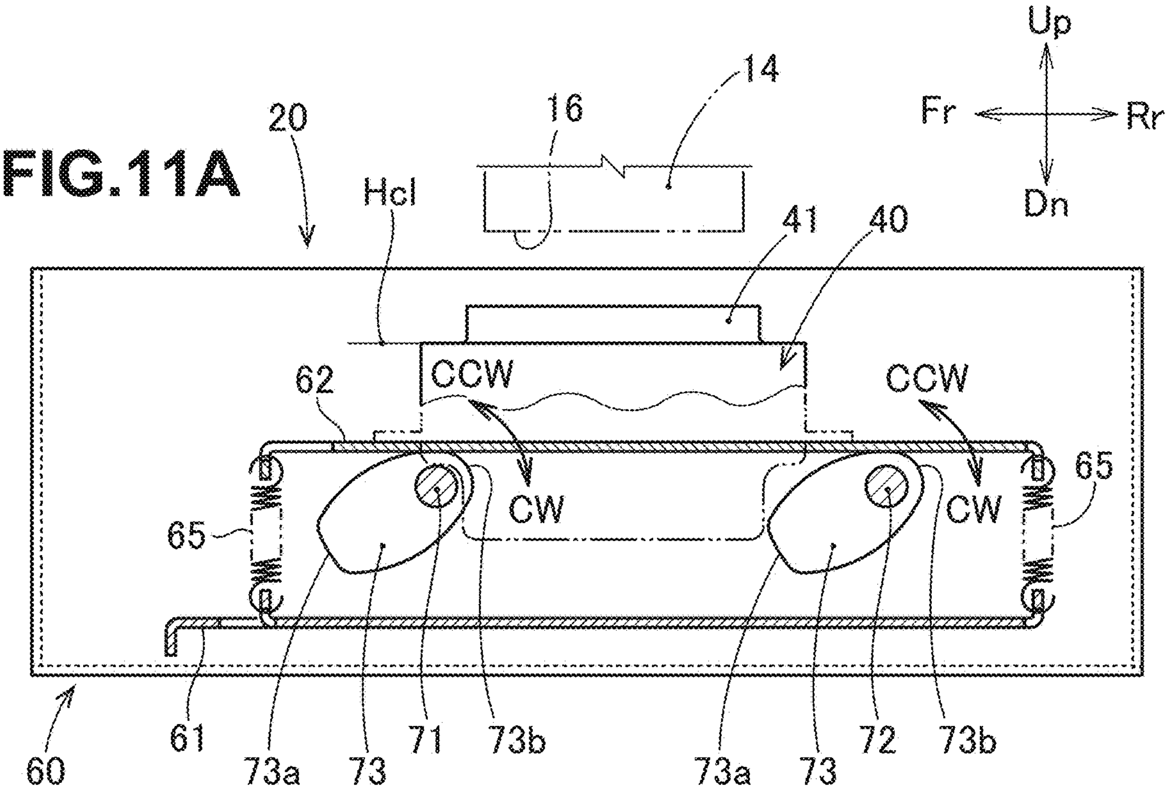
FIG. 11A is a diagram illustrating the operation of a cap when the first camshaft of an example embodiment is located at a reference point in a rotation direction and FIG. 11B is a diagram illustrating the operation of a wiper when the first camshaft shown in FIG. 11A is located at the reference point.
Figure 11B:
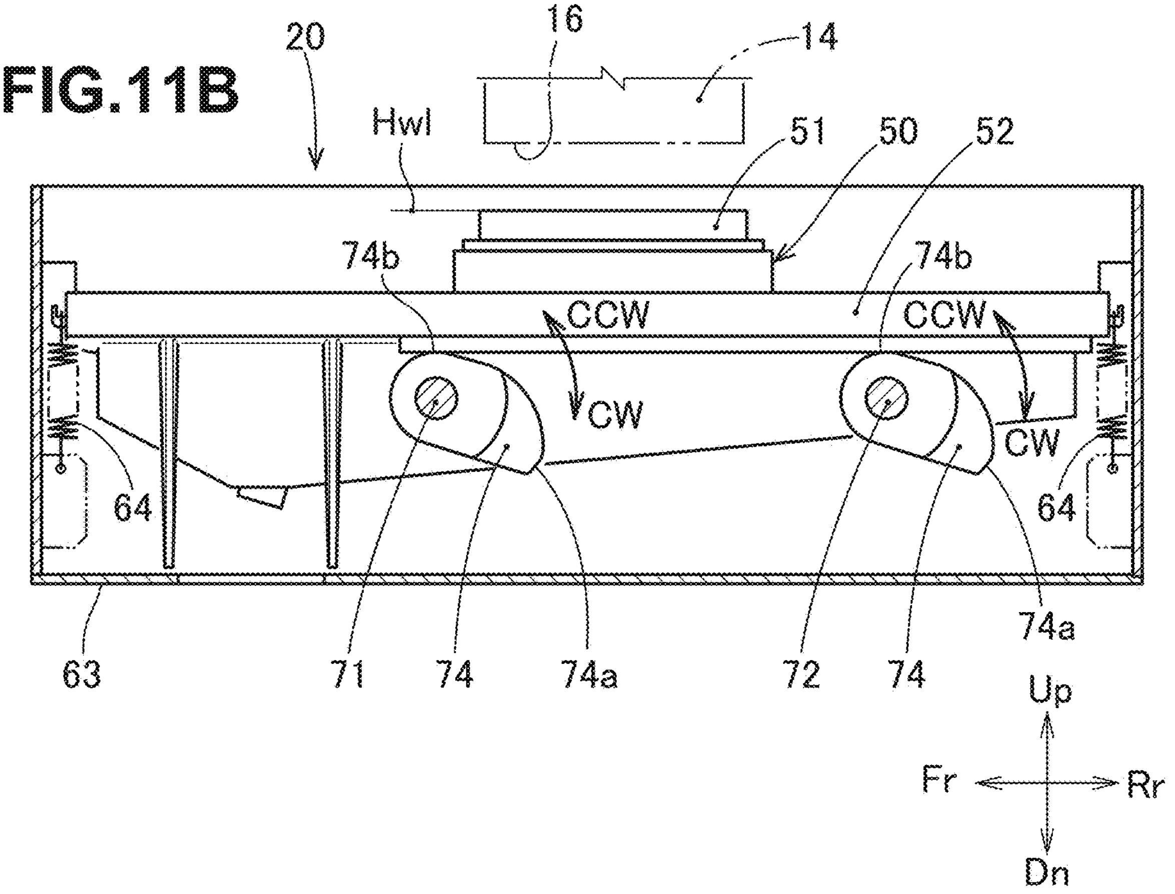

As shown in FIGS. 11A and 11B, the cap assembly 40 and the wiper assembly 50 are maintained in a standby state when not in use. That is, as shown in FIG. 11A, the elevation platform 62 is biased downward relative to the fixed base 61 by the biasing structure 65. The first cam 73 has a first end surface 73*a* that is separated from the elevation platform 62 and a second end surface 73*b* that is in contact with the elevation platform 62. Therefore, the elevation platform 62 and the cap assembly 40 (including the cap 41) are located at the lowest position Hc1.

Further, as shown in FIG. 11B, the wiper support portion 52 is biased downward relative to the sub-base 63 by the biasing structure 64. The second cam 74 has a first end surface 74*a* that is separated from the wiper support portion 52 and a second end surface 74*b* that is in contact with the elevation platform 62. Therefore, the wiper assembly 50 (including the wiper 51) is located at the lowest position Hw1.

Then, the first camshaft 71 is rotated in the first direction CW by the motor 80 (see FIG. 3). Then, the first cam 73 raises the elevation platform 62 and the cap assembly 40 to the highest position shown in FIG. 9 and FIG. 12A. As a result, the height Hc OF the cap 41 rises to the highest position Hch. The cap 41 seals the nozzle surface 16 of the recording head 14.

Figure 12A:
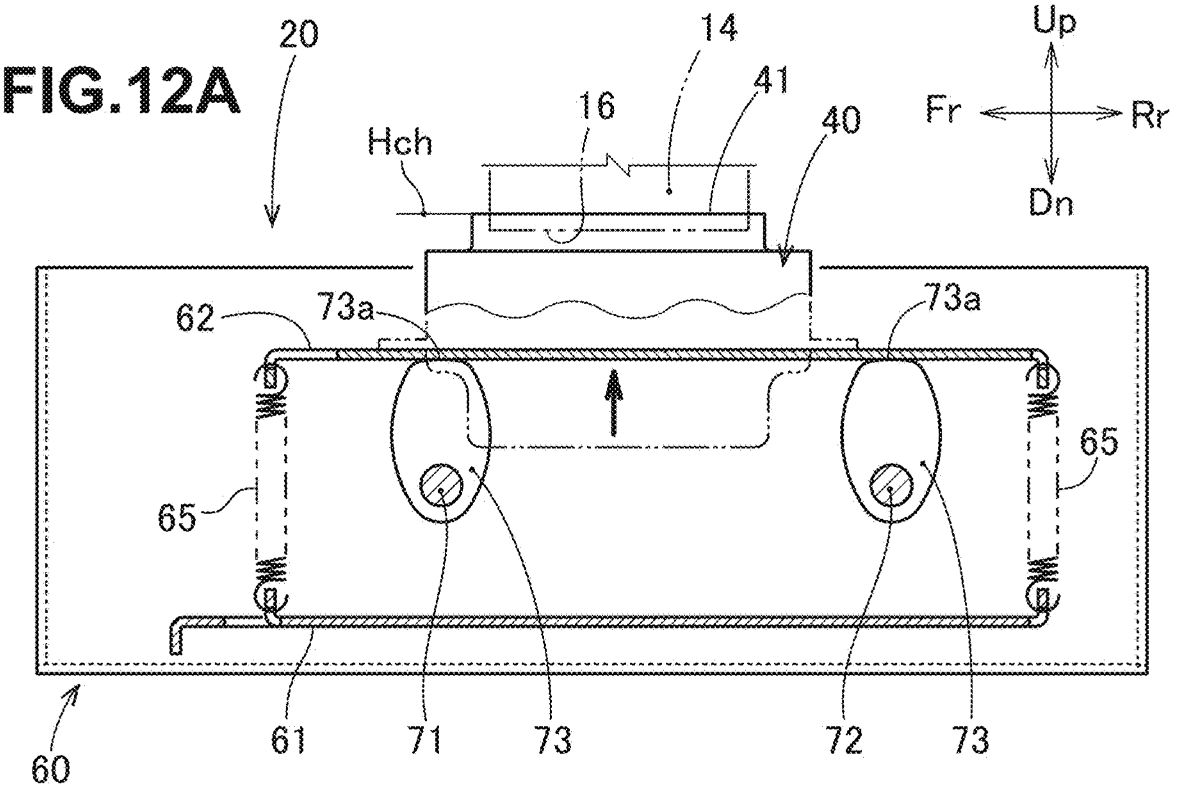
FIG. 12A is a diagram illustrating the operation of the cap when the first camshaft shown in FIG. 11A rotates from the reference point by a first rotation angle range in a first direction and FIG. 12B is a diagram illustrating the operation of the wiper interlocked with the cap shown in FIG. 12A.
Figure 12B:
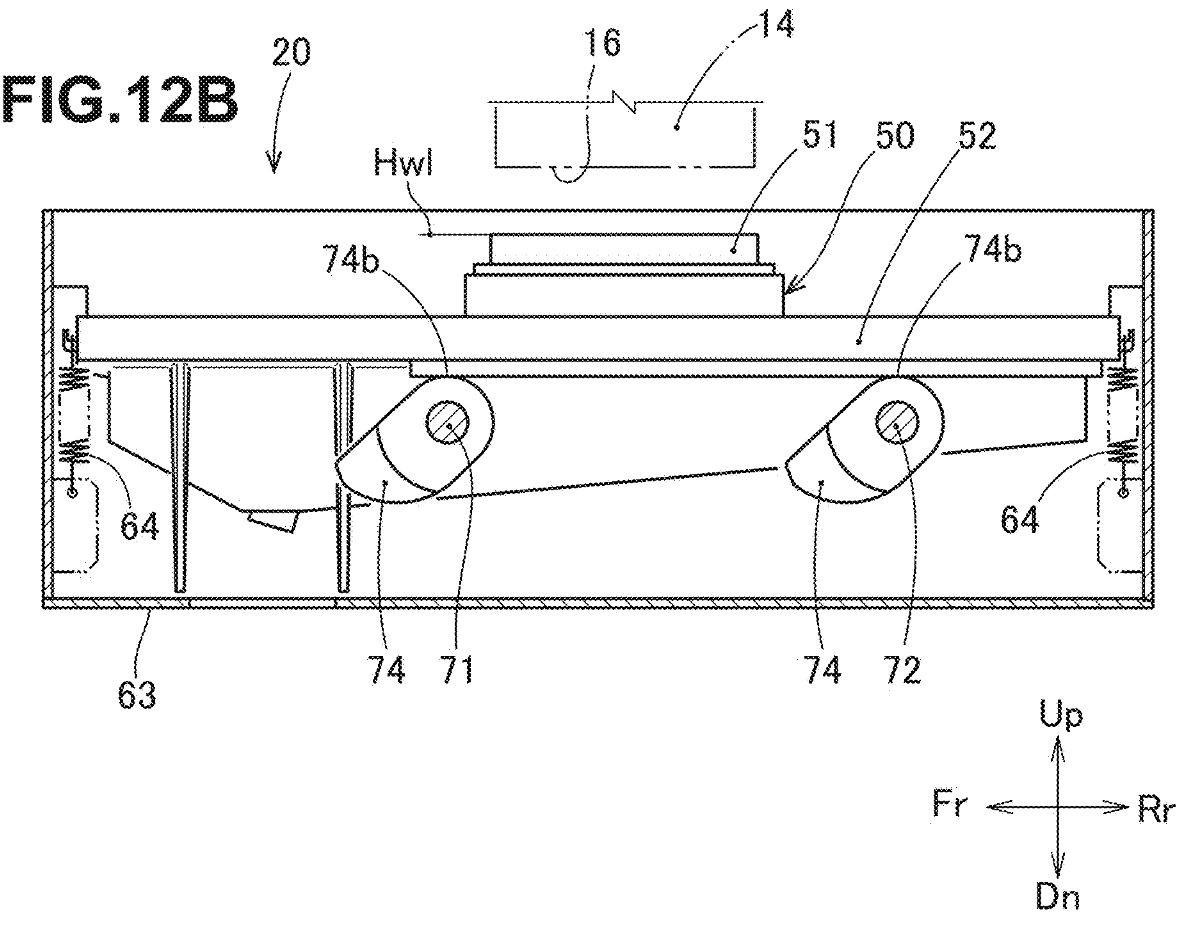

As shown in FIG. 12A, in a state where the first camshaft 71 is rotated from the reference point P0 to the first rotation angle range θ1 in the first direction CW as shown in FIG. 11B, the second cam 74 does not push the wiper assembly 50 upward. Therefore, the wiper assembly 50 is maintained at the lowest position. The height Hw of the wiper 51 is maintained at the lowest position Hw1.

Then, when the first camshaft 71 is rotated in the second direction CCW and returned to the reference point P0, the first cam 73 returns to its original position. The elevation platform 62 and the cap assembly 40 return to the lowest position shown in FIG. 11A. As a result, the height Hc of the cap 41 is lowered to the original lowest position Hc1.

Figure 13A:
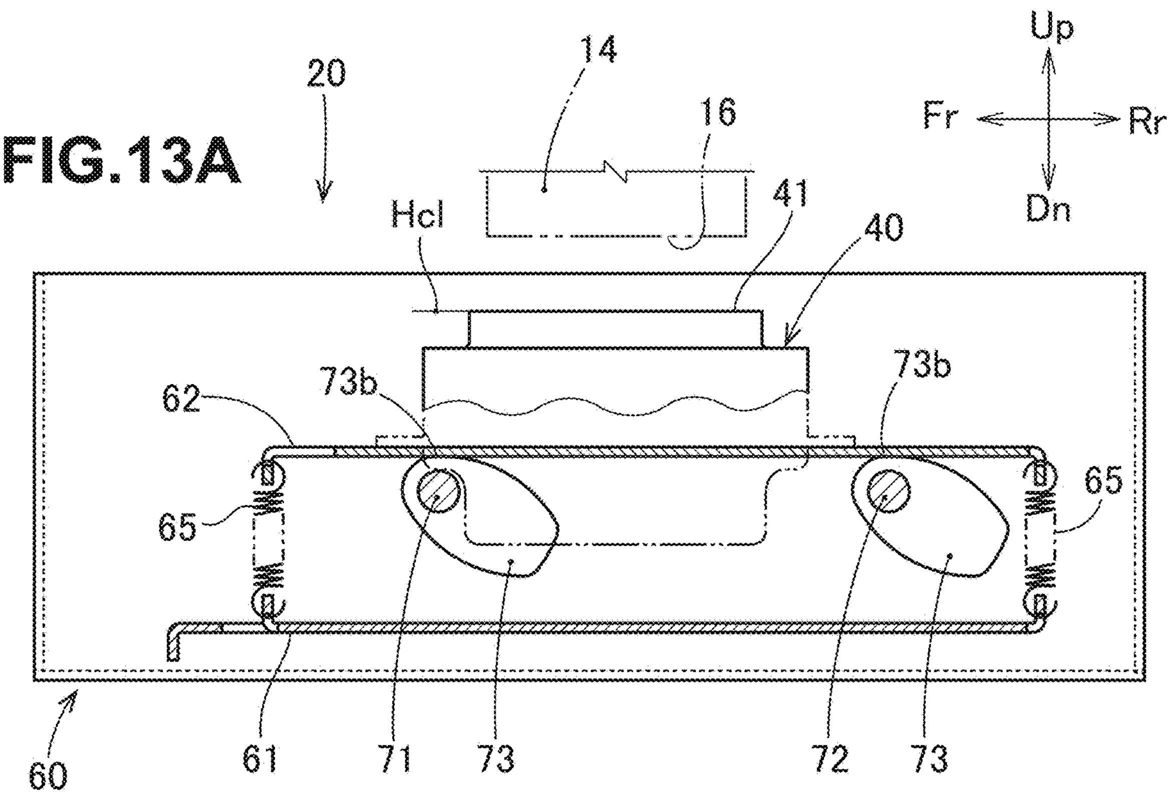
FIG. 13A is a diagram illustrating the operation of the cap when the first camshaft shown in FIG. 11A rotates from the reference point by a second rotation angle range in a second direction and FIG. 13B is a diagram illustrating the operation of the wiper interlocked with the cap shown in FIG. 13A.

Then, the first camshaft 71 is rotated from the reference point P0 in the second direction CCW by the motor 80 (see FIG. 3) in the standby state shown in FIGS. 11A and 11B. However, as shown in FIG. 13A, the first cam 73 does not push the elevation platform 62 and the cap assembly 40 upward. Therefore, the elevation platform 62 and the cap assembly 40 are maintained at the lowest position.

Figure 13B:
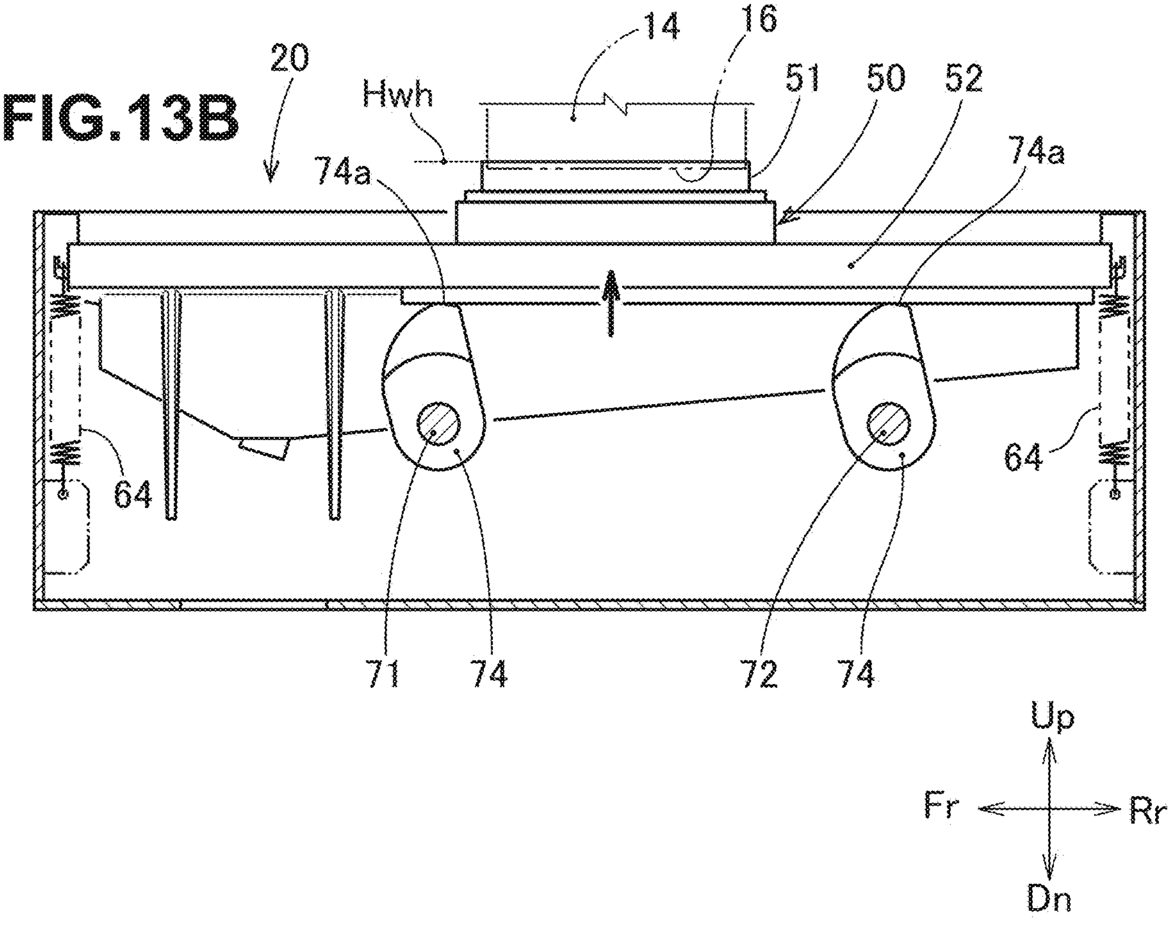

On the other hand, as shown in FIG. 13B, the first camshaft 71 rotates in the second direction CCW so that the second cam 74 raises the wiper support portion 52 to the highest position. As a result, the height Hw of the wiper 51 rises to the highest position Hwh. The wiper 51 can wipe the nozzle surface 16 of the recording head 14.

Then, when the first camshaft 71 is rotated in the first direction CW and returned to the reference point P0, the first cam 73 returns to its original position. The wiper support portion 52 returns to the lowest position shown in FIG. 11B. As a result, the height Hw of the wiper 51 is lowered to the original lowest position Hw1.

If the power supply to the image formation device 10 is cut off for some reasons when the first camshaft 71 is not located at the reference point P0 (origin P0) in the rotation direction, that is, the image formation device is not in the standby state shown in FIGS. 11A and 11B, the following occurs. That is, when power is supplied to the image formation device 10 again, for example, when the power switch is turned on, the controller 140 controls the motor 80 in a direction to return the rotation angle θ of the camshaft 71 to the reference point P0 (see FIG. 9). As a result, the cap 41 and the wiper 51 are returned to the standby state shown in FIGS. 11A and 11B. Therefore, even if the positions of the cap 41 and the wiper 51 in the elevation direction relative to the nozzle surface 16 of the nozzle 15 are unclear, they will not interfere with the carriage 13.

The above description can be summarized as follows.

As shown in FIGS. 1A to 1C, FIG. 3, and FIG. 9, the image formation device 10 includes the recording head 14 which can eject droplets from the nozzle 15, the cap 41 that elevates-is configured to be elevated to the nozzle surface 16 of the nozzle 15 in a sealable manner, the camshaft 71 (first camshaft 71) which is rotatable in the first rotation angle range θ1 from the reference point P0 in the first direction CW and in the second direction CCW opposite to the first direction CW by using the position in the rotation direction when the cap 41 is at the lowest position Hcl as the reference point P0, the first cam 73 which is provided in the camshaft 71 and raises the cap 41 as the camshaft 71 rotates in the first rotation angle range θ1 from the reference point P0, and the motor 80 which drives the camshaft 71 in the first direction CW and the second direction CCW.

In this way, since the rotation of the camshaft 71 that raises the cap 41 is set to the first rotation angle range θ1 from the reference point P0 in the first direction CW, the cap 41 can be raised by rotating the camshaft 71 in the first direction CW, and can be lowered by rotating the camshaft 71 in the second direction CCW. Therefore, even if the position of the cap 41 in the elevation direction relative to the nozzle surface 16 of the nozzle 15 becomes unclear, the cap 41 can be surely lowered by rotating the camshaft 71 in the second direction CCW. The cap 41 can be prevented from interfering with the carriage 13.

Further, as shown in FIGS. 1A to 1C, FIG. 2, FIG. 3, and FIG. 9, the camshaft 71 (first camshaft 71) is also rotatable from the reference point P0 to the second rotation angle range θ2 in the second direction CCW. The image formation device 10 further includes the wiper 51 that elevates the nozzle surface 16 in a wipeable manner, the second cam 74 which is provided in the camshaft 71 and elevates the wiper 51 as the camshaft 71 rotates in the second rotation angle range θ2, the rotation angle detector 120 which detects whether the rotation angle θ of the camshaft 71 is in the reference point P0, the first rotation angle range θ1, or the second rotation angle range θ2, and the controller 140 which controls the motor 80 in a direction to return the rotation angle θ of the camshaft 71 to the reference point P0 when receiving a signal from the rotation angle detector 120 indicating that the rotation angle θ of the camshaft 71 is in either the first rotation angle range θ1 or the second rotation angle range θ2.

In this way, the rotation direction of the camshaft 71 is divided into the first direction CW in which the cap 41 is elevated from the reference point P0 (origin P0) and the second direction CCW in which the wiper 51 is elevated. The rotation angle detector 120 can detect whether the rotation angle θ of the camshaft 71 is in the reference point P0, the first rotation angle range θ1, or the second rotation angle range θ2. When power is supplied to the image formation device 10 (the power switch is turned on), the controller 140 controls the motor 80 in a direction to return the rotation angle θ of the camshaft 71 to the reference point P0 when receiving a signal from the rotation angle detector 120 indicating that the rotation angle θ of the camshaft 71 is in either the first rotation angle range θ1 or the second rotation angle range θ2 (that is, the rotation angle is not in the reference point P0). Therefore, when the power supply to the image formation device 10 is cut off for some reasons and then resumed, the cap 41 does not rise and interfere with the carriage 13.

Further, as shown in FIG. 6, FIG. 8A, and FIG. 9, the rotation angle detector 120 includes the semicircular detection object 121 that rotates together with the camshaft 71 (first camshaft 71) and the detector 122 that can detect the rotation angle θ of the camshaft 71 by detecting the detection object 121 itself. The detection object 121 has one end 121*a* (first end 121*a*) in the circumferential direction corresponding to the position of the reference point P0, and is continuous from the reference point P0 over the entire second rotation angle range θ2.

Therefore, the reference point P0, the first rotation angle range θ1, and the second rotation angle range θ2 can be detected by the rotation angle detector 120 with a simple configuration.

Further, as shown in FIG. 3 and FIG. 6, the output shaft 81 of the motor 80 and the camshaft 71 are connected by the gear mechanism 90. The detection object 121 is integrally provided in the final gear 95 (fourth gear 95) provided in the camshaft 71 in the gear mechanism 90.

Since the detection object 121 is integrally provided in the final gear 95, the number of parts may be small.

Further, as shown in FIG. 7, FIG. 8B, and FIG. 9, the image formation device 10 further includes the first stopper 131 which restricts the rotation of the camshaft 71 in the first direction CW and the second stopper 132 which restricts the rotation of the camshaft 71 in the second direction CCW. The limit point L1 of the rotation of the camshaft 71 in the first direction CW relative to the reference point P0 is located in the first direction CW by a preset constant angle α relative to the rotation angle θ of the camshaft 71 when the cap 41 is at the highest position Hch. The first stopper 131 is located at the limit point L1 of the rotation in the first direction CW. The second stopper 132 is located at the limit point L2 of the second rotation angle range θ2 relative to the reference point P0.

In this way, since the first stopper 131 and the second stopper 132 are provided, excessive rotation of the camshaft 71 can be restricted. Further, when the cap 41 is raised to the highest position Hch, the rotation angle θ of the camshaft 71 is further increased by a constant angle α to more reliably seal the nozzle surface 16 of the nozzle 15 of the recording head 14 with the cap 41.

As long as one or more of the functions and effects described herein are achieved, the present invention is not limited to the example embodiments described herein.

For example, the rotation angle detector 120 only needs to be able to distinguish between the reference point P0, the first rotation angle range θ1, and the second rotation angle range θ2.

Image formation devices according to example embodiments of the present invention are suitable for inkjet printers.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An image formation device comprising:

a recording head which is capable of ejecting droplets from a nozzle;

a cap configured to be elevated to a nozzle surface of the nozzle in a sealable manner;

a camshaft which is rotatable in a first rotation angle range from a reference point in a first direction and a second direction opposite to the first direction by using a position in a rotation direction when the cap is located at the lowest position as the reference point;

a first cam provided in the camshaft to raise the cap as the camshaft rotates in the first rotation angle range from the reference point; and a motor to drive the camshaft in the first direction and the second direction, wherein the camshaft is also rotatable in a second rotation angle range from the reference point in the second direction; and the image formation device further comprises a wiper to elevate the nozzle surface in a wipeable manner, a second cam provided in the camshaft to elevate the wiper as the camshaft rotates in the second rotation angle range, a rotation angle detector to detect whether a rotation angle of the camshaft is in the reference point, the first rotation angle range, or the second rotation angle range, and a controller configured or programmed to control the motor in a direction to return the rotation angle of the camshaft to the reference point when receiving a signal from the rotation angle detector indicating that the rotation angle of the camshaft is in either the first rotation angle range or the second rotation angle range.

2. The image formation device according to claim 1, wherein the rotation angle detector includes a semicircular detection object rotatable together with the camshaft and a detector capable of detecting the rotation angle of the camshaft by detecting the detection object itself; and the detection object has one end in a circumferential direction corresponding to a position of the reference point and is continuous from the reference point over an entirety of the second rotation angle range.

3. The image formation device according to claim 2, wherein an output shaft of the motor and the camshaft are connected by a gear mechanism; and the detection object is integrally provided in a final gear provided in the camshaft in the gear mechanism.

4. The image formation device according to claim 1, further comprising:

a first stopper to restrict rotation of the camshaft in the first direction; and a second stopper to restrict rotation of the camshaft in the second direction; wherein a limit point of the rotation of the camshaft in the first direction relative to the reference point is located in the first direction by a preset constant angle relative to the rotation angle of the camshaft when the cap is located at the highest position;

the first stopper is located at a limit point of the rotation in the first direction; and the second stopper is located at a limit point of the second rotation angle range relative to the reference point.

5. The image formation device according to claim 4, wherein the first stopper and the second stopper have a strength against a maximum load received by a maximum output of the motor.

6. The image formation device according to claim 4, wherein the first stopper and the second stopper include a single pin which extends from the final gear along the camshaft and a fixing structure including a single arc elongated hole centered on the camshaft so that the pin is fittable thereinto; and the detector is attached to the fixing structure.

7. An image formation device comprising:

a recording head which is capable of ejecting droplets from a nozzle;

a cap configured to be elevated to a nozzle surface of the nozzle in a sealable manner;

a camshaft which is rotatable in a first rotation angle range from a reference point in a first direction and a second direction opposite to the first direction by using a position in a rotation direction when the cap is located at the lowest position as the reference point;

a first cam provided in the camshaft to raise the cap as the camshaft rotates in the first rotation angle range from the reference point; and a motor to drive the camshaft in the first direction and the second direction, wherein an output shaft of the motor and the camshaft are connected by a gear mechanism; and the gear mechanism includes at least one gear provided with a dial which is manually turnable while the motor is stopped.

8. The image formation device according to claim 7, wherein the dial is covered by a removable cover.

* * * * *